Patented Mar. 30, 1954

2,673,809

UNITED STATES PATENT OFFICE 2,673,809

PROCESS FOR FORMING OPTICAL GLASS BY MELTING IN PLATINUM VESSELS

Gustav Weissenberg and Otto Ungemach, Marburg (Lahn), Germany, assignors to Ernst Leitz G. m. b. H., Wetzlar (Lahn), Germany, a corporation of Germany No Drawing. Application July 3, 1951,
Serial No. 235,114

Claims priority, application Germany July 8, 1950

4 Claims. (Cl. 106—47)

Our present invention relates to a process for preparing optical glass by melting in platinum vessels.

In order to melt optical glass with the greatest possible homogeneity and freedom from striae and bubbles, efforts have recently been made to carry through the entire melting in platinum vessels. Because of the clinging of glass particles to the platinum vessel one is forced, when changing to a glass of different composition, to melt out these particles with soda, for example, in order to remove every trace of the preceding melt from the platinum vessel.

An object of our invention is to avoid this condition. A further object of the invention is the protection of the platinum vessel and accordingly to increase the economy of the operation.

We have found that an addition of from ¼% to 10% by weight of tellurium oxide, $TeO_2$ or $TeO_3$ to the fused mass of the glass is sufficient to attain generally that the melt does not adhere to the platinum vessels.

Moreover, through a gradual addition of tellurium oxide, an extraordinary thinning of the melt is obtained so that the blending is much easier than was heretofore possible. Instead of $TeO_2$ the six valence oxide of tellurium $TeO_3$ can be used, which is apparently reduced in the melt to $TeO_2$. A higher addition to the melt of $TeO_2$ or $TeO_3$ than 1% generally causes a strong increase in the index of refraction which is of course combined with an increase in dispersion.

Alloying or injury of the platinum vessel has not been found after several months research with tellurium oxide.

What we claim is:

1. Process for preparation of optical glass by melting down a mixture in platinum vessels in which from ¼% to 10% by weight of tellurium oxide is added to the melt, and in which the tellurium has a valence of at least four.

2. The process of claim 1 in which the amount of tellurium oxide is from ¼% to 1% of the weight of the melt.

3. The process of claim 1 in which the tellurium oxide is $TeO_2$.

4. The process of claim 1 in which the tellurium oxide is $TeO_3$.

GUSTAV WEISSENBERG.
OTTO UNGEMACH.

References Cited in the file of this patent

UNITED STATES PATENTS

| Number | Name | Date |
|---|---|---|
| 2,411,031 | Deyrup | Nov. 12, 1946 |
| 2,444,845 | Perley | July 6, 1948 |
| 2,497,235 | Perley | Feb. 14, 1950 |

OTHER REFERENCES

The Glass Industry, vol. 13, No. 8, August 1932, page 133.